Dec. 18, 1951    J. A. TUCK    2,579,281
ELECTRICALLY ACTUATED SLIDE PROJECTOR
WITH REMOTE CONTROL
Filed Sept. 14, 1949    9 Sheets-Sheet 2
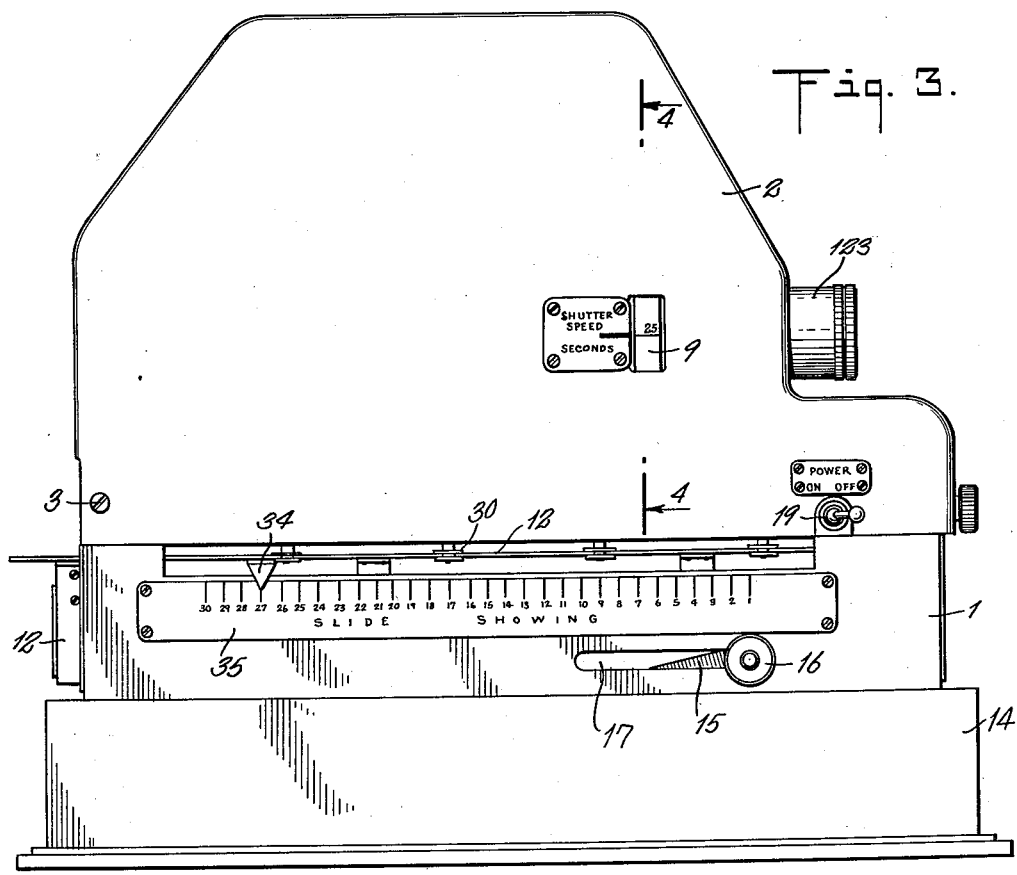
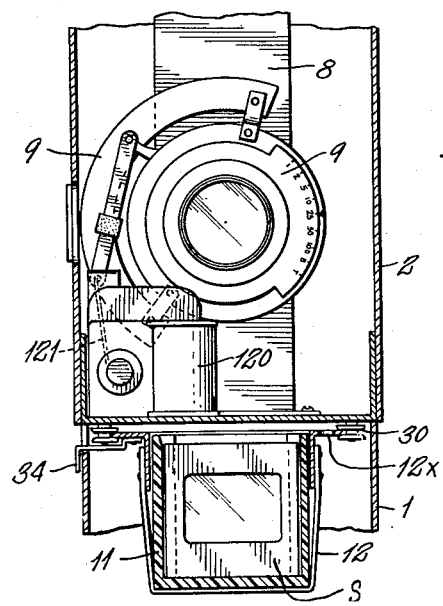
INVENTOR.
JAMES ALLEN TUCK
BY
ATTORNEY

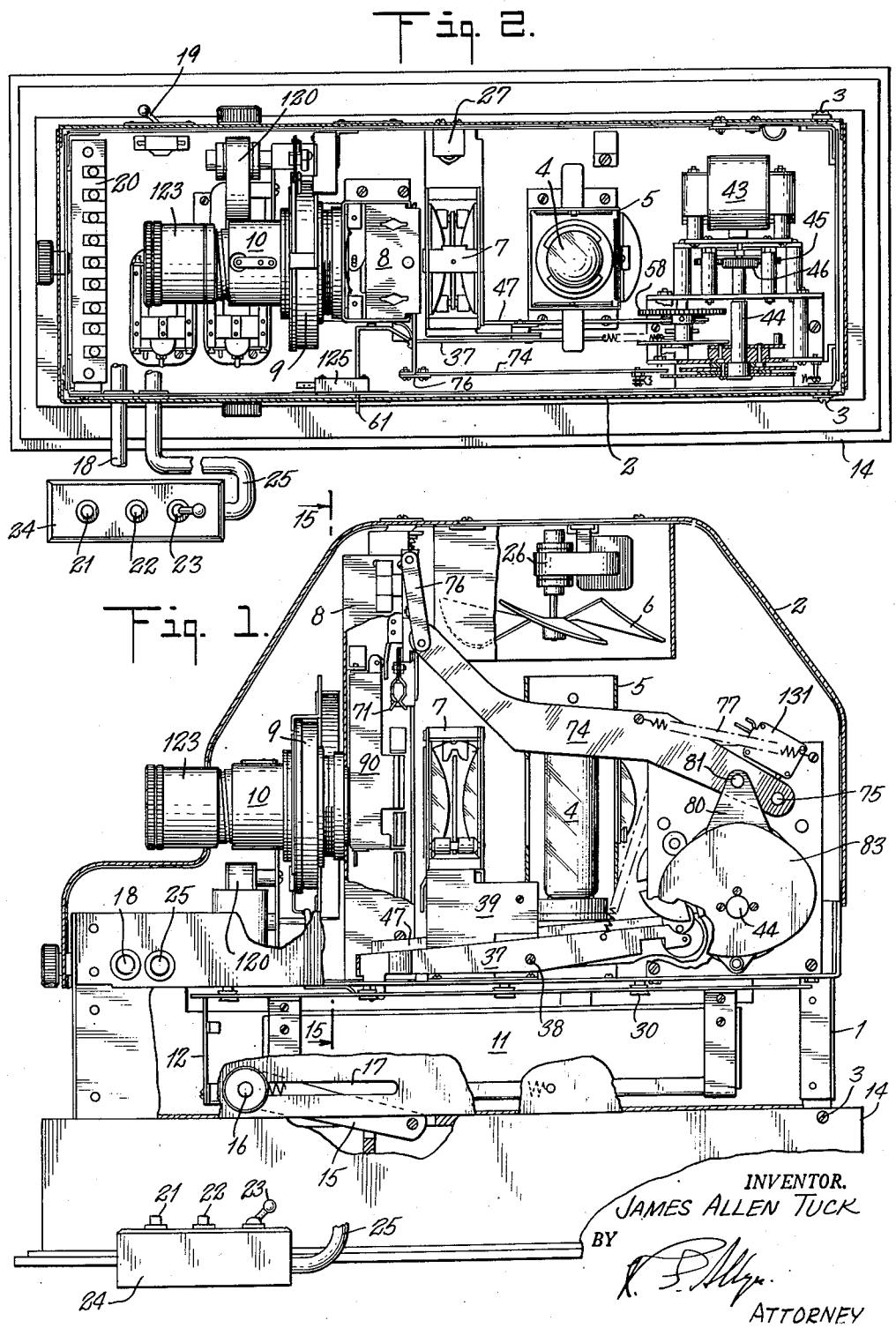

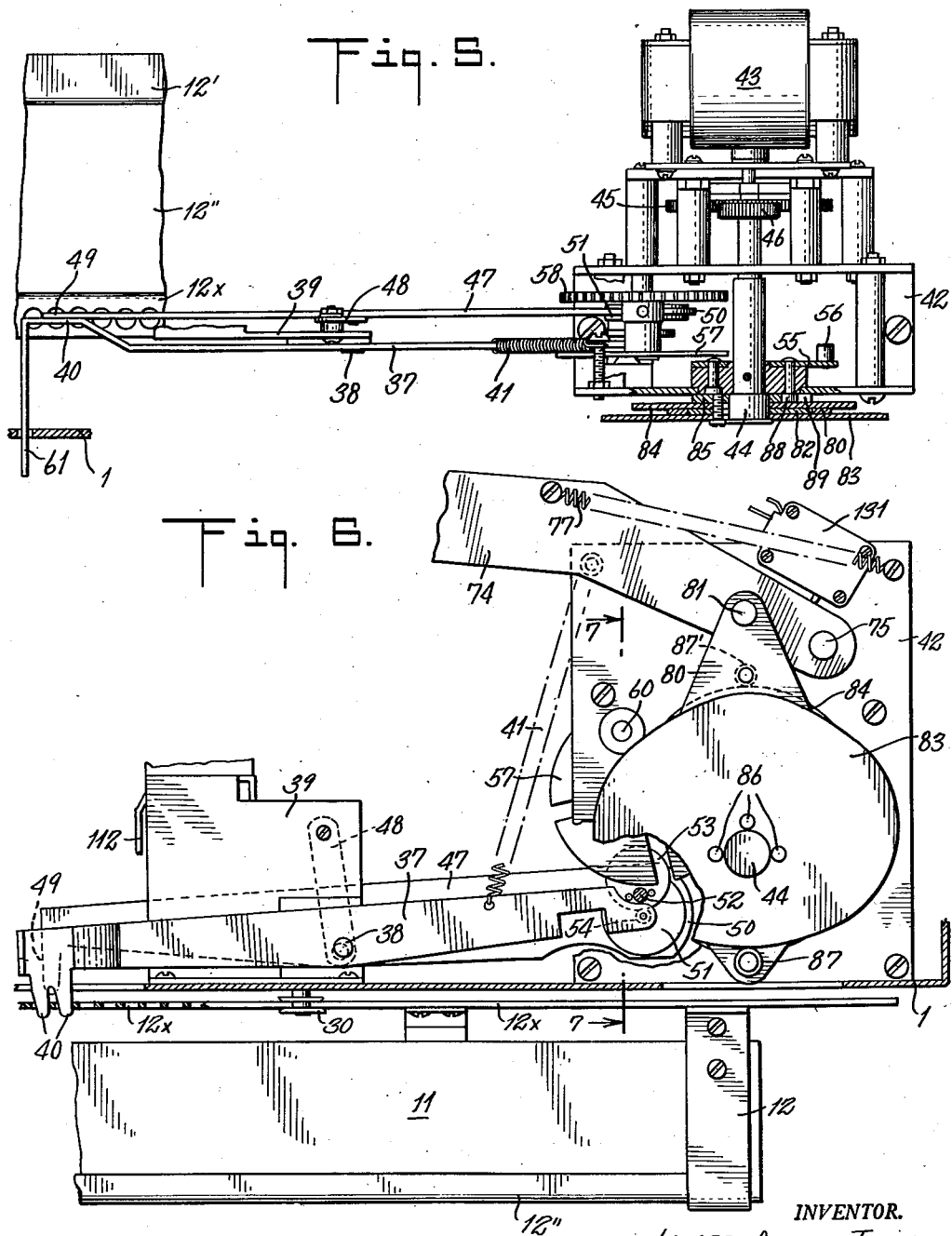

Dec. 18, 1951 J. A. TUCK 2,579,281
ELECTRICALLY ACTUATED SLIDE PROJECTOR
WITH REMOTE CONTROL
Filed Sept. 14, 1949 9 Sheets-Sheet 4
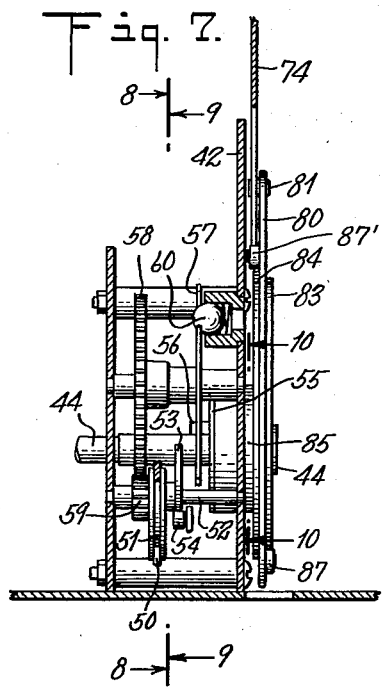
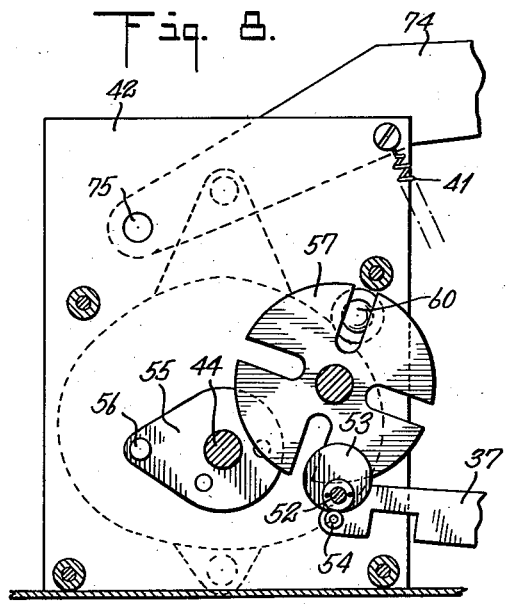
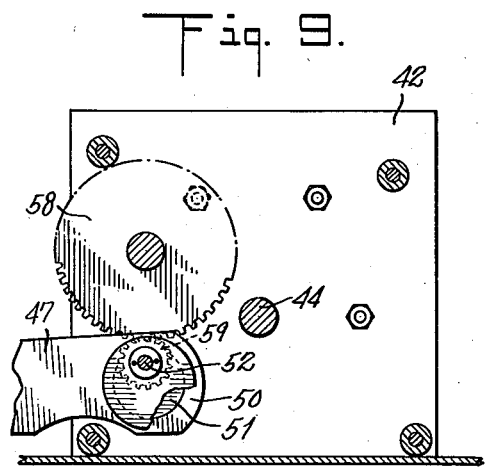
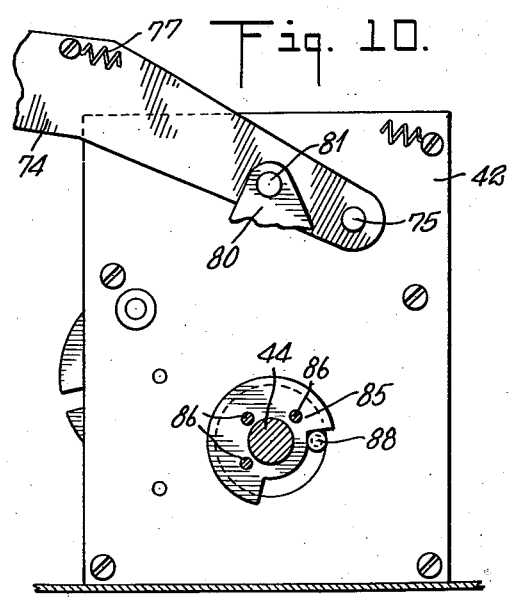
INVENTOR.
JAMES ALLEN TUCK
BY
ATTORNEY

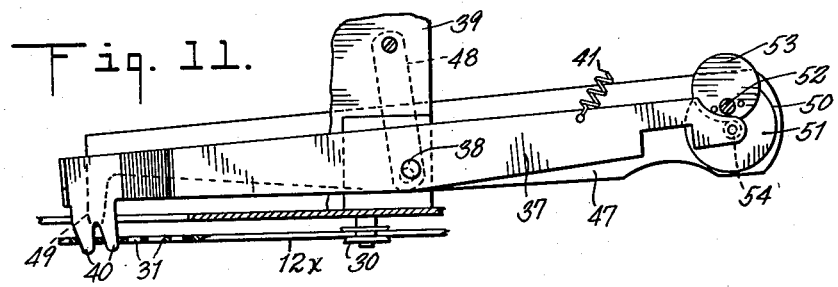
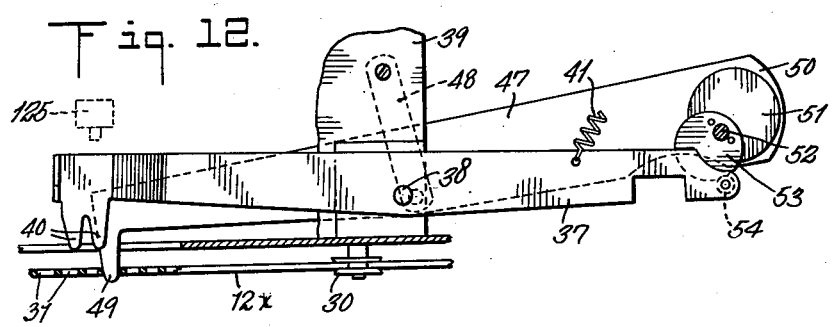
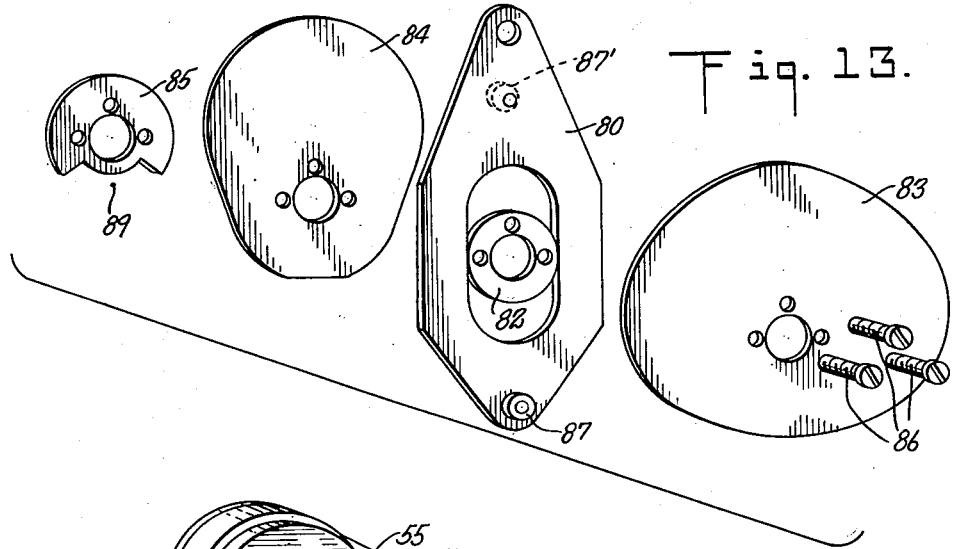
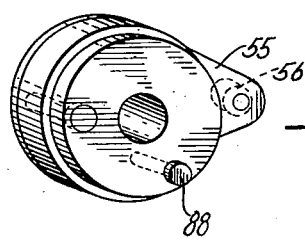

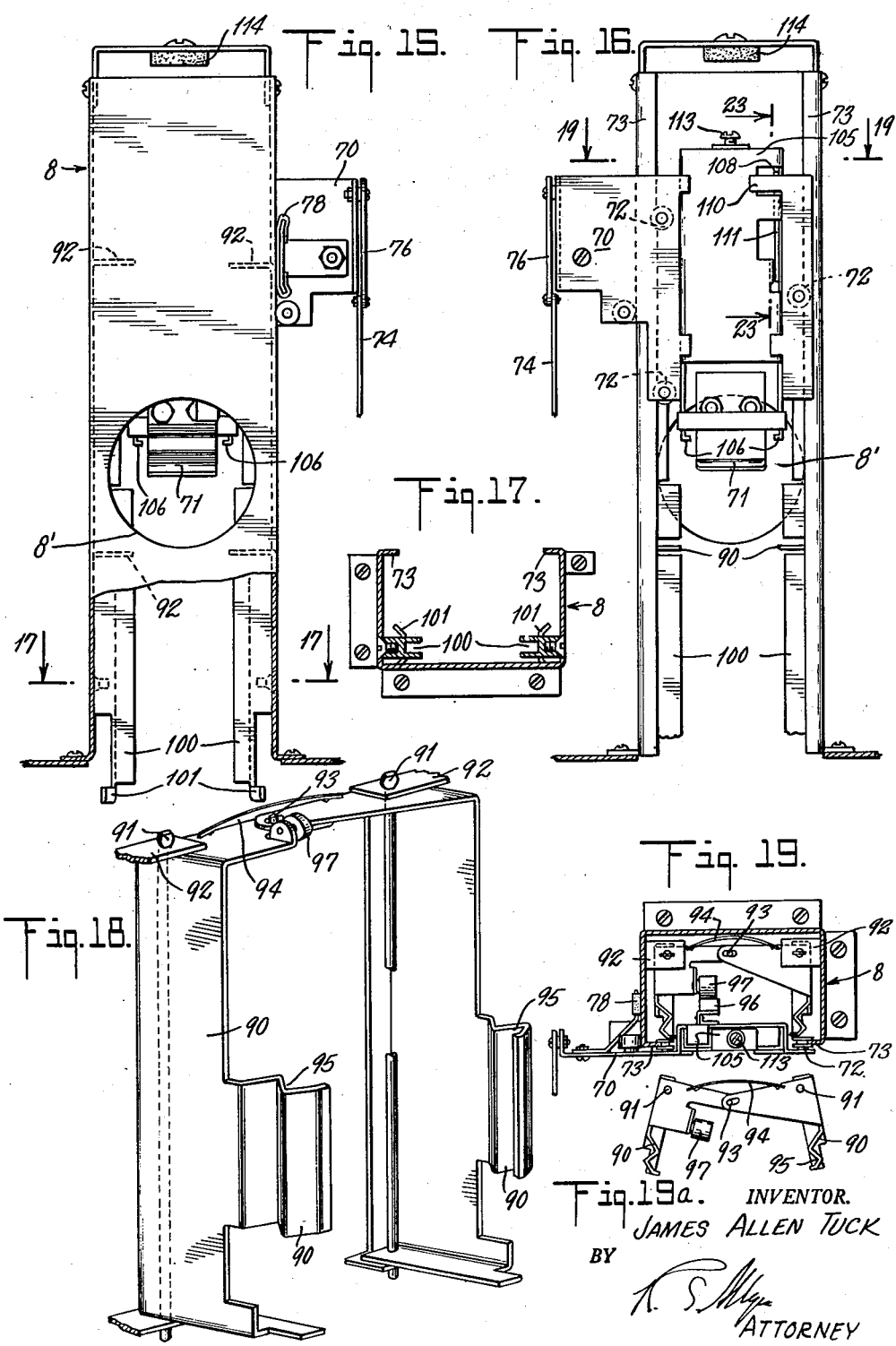

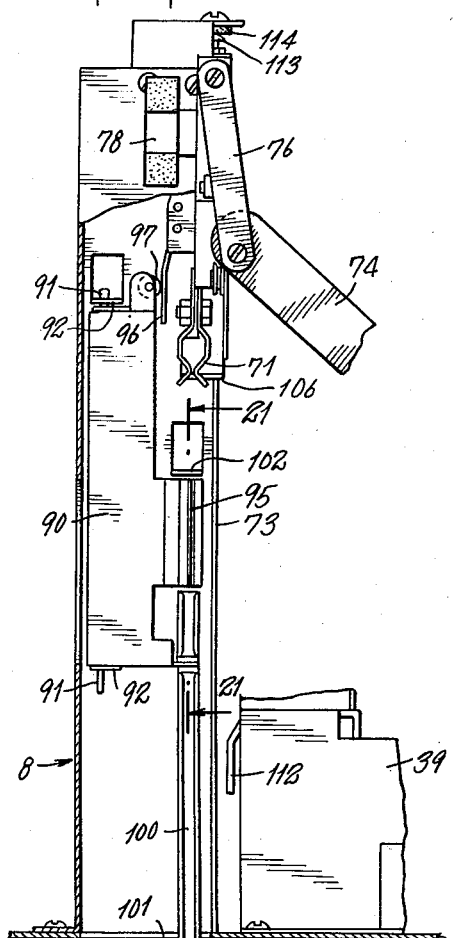
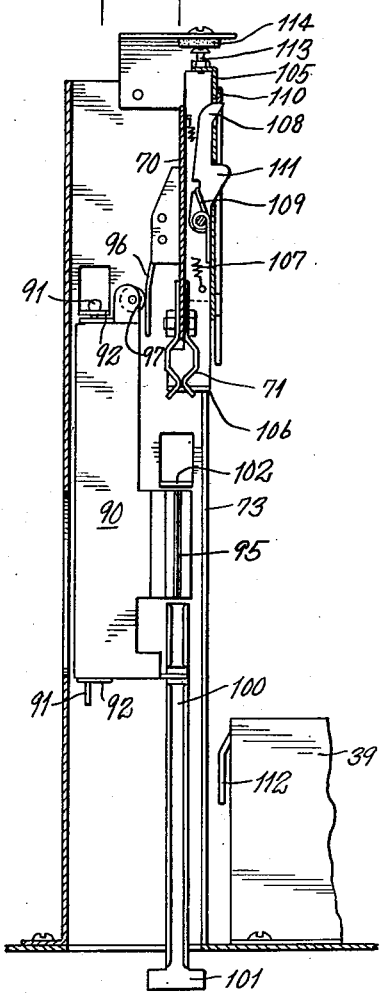
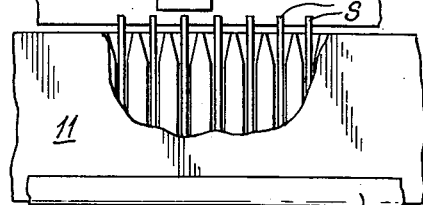
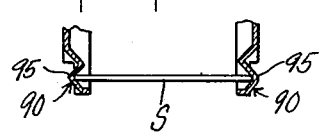
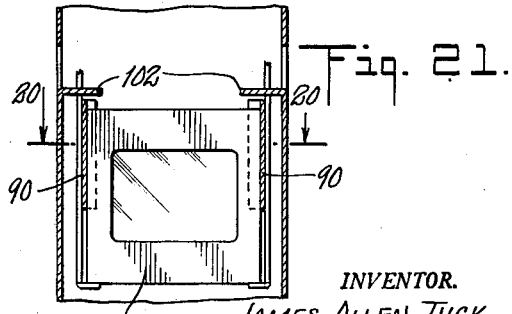

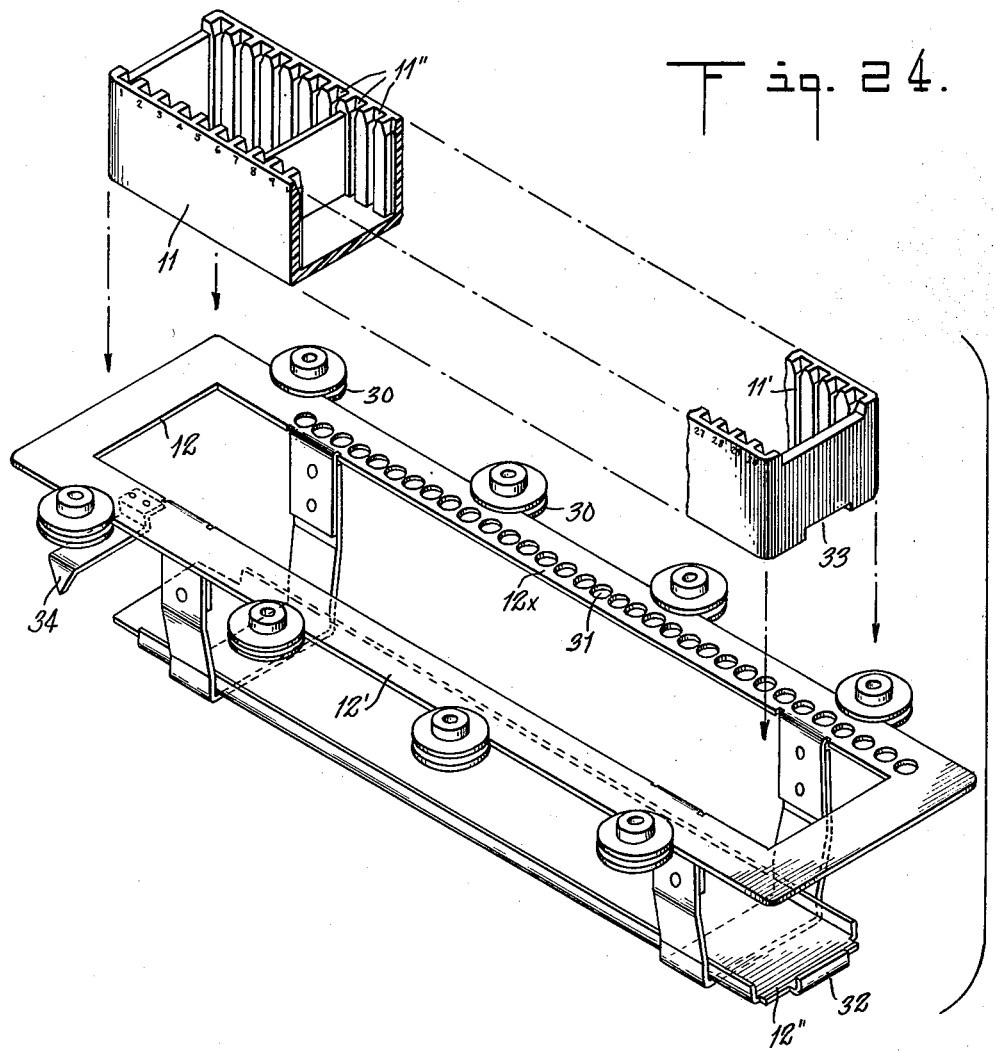

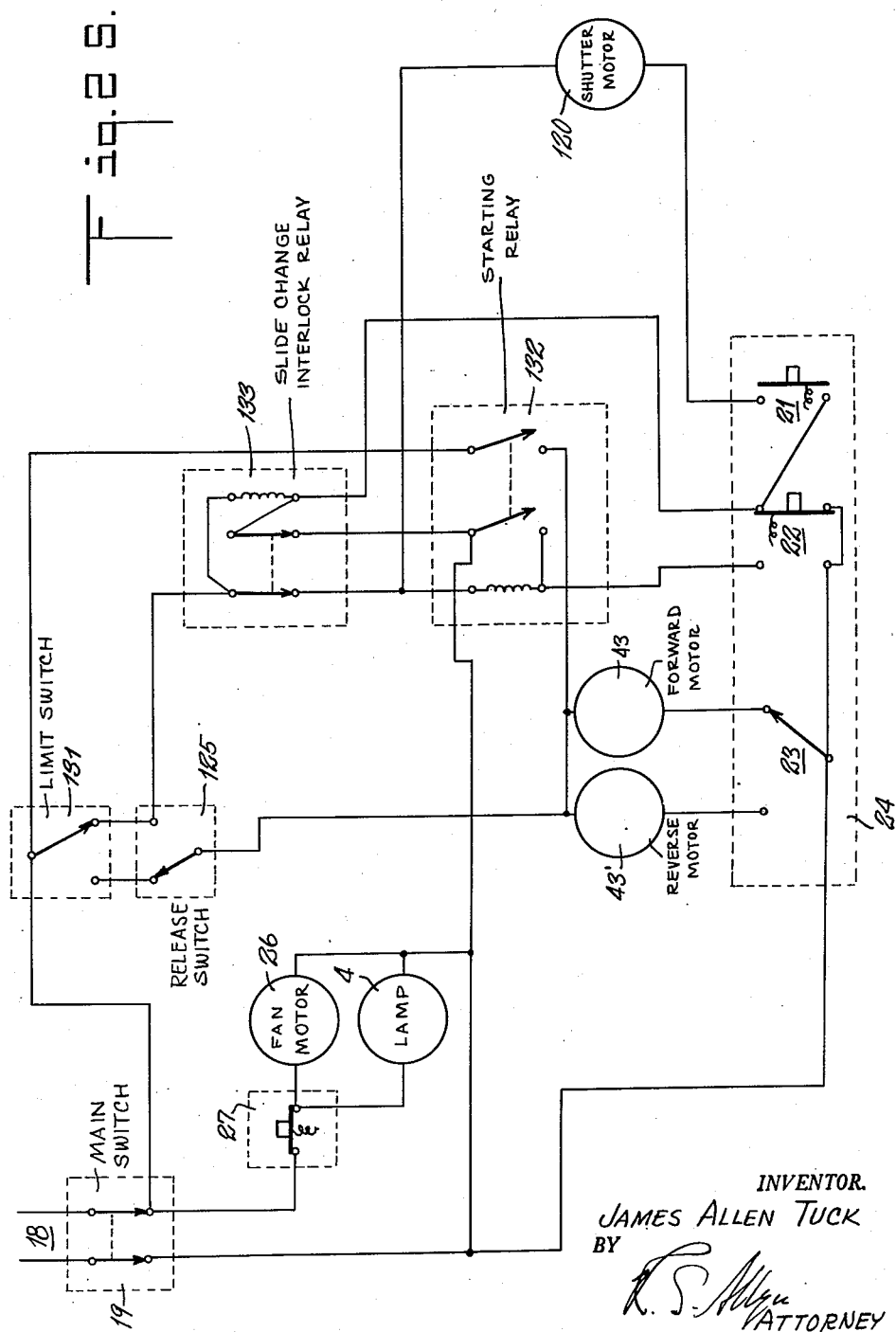

Patented Dec. 18, 1951

2,579,281

UNITED STATES PATENT OFFICE 2,579,281

ELECTRICALLY ACTUATED SLIDE PROJECTOR WITH REMOTE CONTROL

James Allen Tuck, New York, N. Y.

Application September 14, 1949, Serial No. 115,692

8 Claims. (Cl. 88—28)

A practical slide projecting machine involves a number of features such as control of selection of the consecutive slides from a carrying tray, centering of each slide between the light source lamp and the projecting lens, control of the exposure, return of each slide to the tray, feeding of the tray, reversal of the movement of the tray for a repeat display of a selected slide, a housing for the projecting system and mechanism, ventilation of the housing and safety switches for protection against careless operation.

My invention contemplates an embodiment of all these features but it should be understood that I regard the invention as covering the combinations as set forth in the claims and as not otherwise limited.

Some of the features such as the loading of the tray, the focusing of the projector and the operation of the safety switches are controlled at the projector per se whereas the direction of feed of the tray, the control of the pick-up and return of the slides and the timing of the shutter are controlled by action of switches in a remote control unit connected by cord or cable to the projector.

I accordingly provide a housing which contains the light source and a projecting lens system with a control shutter mechanism. Lantern slides of any conventional type are carried by a tray which is demountably supported in a carriage which is movable longitudinally in the housing. Slides are lifted by pick-up jaws from the tray and centered in the optical axis of the projecting system, shown according to the time setting of the shutter mechanism and returned to the tray. The carriage then moves to bring the next slide beneath the pick-up jaws which descend and engage and lift it to a showing position.

Each slide is returned to the tray when the next slide is required. The transfer of slides from the tray to the showing position, the operation of the shutter, the return of the slides to the tray and the feeding of the carriage and tray are effected by motor driven mechanism controlled by switches in a control unit which may be located at a distance from the housing.

The action which selects and shows a single slide and returns it to a supply may be regarded as a complete cycle. The relays and circuits are so arranged that the starting switch must be operated to start each cycle.

The carriage feeding mechanism may be reversed so as to return the carriage and repeat the showing of a slide if desired.

I have arranged a spring loaded safety switch which must be closed and held either manually or by the closing of the cover of the housing.

To avoid overheating I provide a cooling fan for the lamp which is automatically turned on whenever the lamp is on.

The carriage is automatically locked in position in the housing except when actually feeding. This locking device should be released in order to remove the carriage. I accordingly provide a switch in the control circuit which is opened automatically when releasing the locking device.

The accompanying drawings illustrate the preferred form of projector and its control mechanism.

Fig. 1 is a side view of the left side of one form of machine embodying the invention, parts being broken away and parts being in section and showing the cover closed and the slide pick-up in the raised position and showing a remote control unit.

Fig. 2 is a plan view and partial section of the same.

Fig. 3 is a view of the right side of the machine.

Fig. 4 is a front view and section of a fragment showing the tray and carriage for the slides and means for actuating the shutter, the section being taken on the plane of the line 4—4 of Fig. 3.

Fig. 5 is a fragmentary plan and section on a larger scale showing the mechanism for moving the slide tray and carriage step by step and the means for locking the carriage.

Fig. 6 is a side view of the mechanism of Fig. 5.

Fig. 7 is a sectional view on the plane of the line 7—7 of Fig. 6.

Fig. 8 is a side view and section on the plane of the line 8—8 of Fig. 7.

Fig. 9 is a side view and section on the plane of the line 9—9 of Fig. 7.

Fig. 10 is a side view and section on the plane of the line 10—10 of Fig. 7.

Fig. 11 is a fragmentary side view of the carriage-moving or feeding ratchet mechanism in the locked position.

Fig. 12 is a view of the parts of Fig. 11 in the feeding position.

Fig. 13 is an exploded perspective view of parts of the driving member of the slide pick-up on an enlarged scale.

Fig. 14 is a perspective view of one of the parts of the timing members.

Fig. 15 is a front view of the vertical guide tube and the slide pick-up.

Fig. 16 is a rear view of the parts of Fig. 15.

Fig. 17 is a horizontal sectional view of the pick-up guide, the section being on the plane of the line 17—17 of Fig. 15.

Fig. 18 is a fragmentary perspective view of the slide holder on a larger scale.

Fig. 19 is a plan view and horizontal section on the plane of the line 19—19 of Fig. 16 showing slide holding parts in the slide holding position.

Fig. 19a is a plan view of the slide holding members spread apart in their receiving position.

Fig. 20 is a fragmentary horizontal sectional view showing a slide held by the gripping and centering holders, taken on the plane of the line 20—20 of Fig. 21.

Fig. 21 is a rear view and section taken on the plane of the line 21—21 of Fig. 22 of a fragment of the guide and slide holder with a slide in place.

Fig. 22 is a side view and vertical section of the slide pick-up mechanism with the pick-up jaws in the raised position.

Fig. 23 is a vertical sectional view of the pick-up device and guideway, taken on the plane of the line 23—23 of Fig. 16.

Fig. 24 is a drop perspective showing the slide holding tray and the carrier.

Fig. 25 is a diagram showing the circuits, motors, relays and control switches.

General construction

The casing of the projector has a body portion 1 and a cover 2 hinged at 3. These parts enclose the lamp 4 with its chimney 5, cooling fan 6, the condensing lens 7, the vertical slide pick-up guide tube 8, the shutter mechanism 9, the projecting lens 10, the slide-holding tray 11, its carriage 12 and the actuating mechanism relays and local control switches and relays.

The casing is mounted on a base 14 and may be tilted and held at a desired angle in a conventional manner, as for instance, by arms 15, 15 hinged at 16 to the base and clamped by screws 16 slidable in slots 17 in the sides of the body.

Power is supplied from ordinary lighting circuit by cable 18 through main switch 19 and distributed from a terminal strip 20 to the lamp and the local switches, relays and motors to be described.

Remote control

The opening of the shutter mechanism, the transfer of the slides S from the tray to the holder and return to the tray and the direction of movement of the tray carriage are controlled respectively by switches 21, 22 and 23 in a remote control unit 24 connected to the projector housing by a cable 25.

Switch 21 controls the opening action of the shutter. Two-way switch 22 closes the control circuits for the mechanism which serves to pick-up and center a slide in the optical axis of the lens of the projector and feeds the tray. Two-position lever switch 23 determines the direction of movement of the tray. These switches control relay and motor circuits to be described.

Ventilation

The fan motor 26 is carried by the cover and its circuit is in parallel with the lamp 4 in a circuit controlled by a local snap switch 27 which is mounted on the body of the casing and normally open when the cover is open. When the cover is closed, it closes this switch circuit. The result is that the cover must be closed and the cooling fan in operation when the lamp is on, thus avoiding overheating. This switch may, however, be closed by hand.

Slide tray and carriage (Fig. 24)

The tray 11 in its preferred form is a single piece of molded plastic and has pockets 11' with funnel-like mouths 11" adapted to receive and center the individual slides S. The tray can be designed to hold any suitable number of slides, in this instance thirty.

The carriage 12 has flange 12' and 12x which are slidably supported by guide rollers 30 which are rotatably supported by body 1 of the casing. The tray is removably supported by the bottom 12" of the carriage, which is hung from the flanges 12' and 12x. The flange 12x has recesses or perforations 31 which are spaced longitudinally to correspond with the slide pockets in the tray and constitutes the feeding rack. The flanges 12', 12x are spaced laterally to receive the tray and one end of the carriage has a projection 32 adapted to fit a recess 33 in the tray so as to make certain that the tray is inserted with the slides in proper order. The carriage has a pointer 34 which extends outside the casing so as to travel along the numbered scale 35 to indicate the position of the carriage and tray.

Carriage feed (Fig. 5 to 13)

In the inactive position, the carriage is held stationary by a locking lever 37 which is pivoted at 38 in a stationary plate 39 and has two prongs 40 which extend into ratchet-like perforations 31 in the flange 12x of the carriage. This lever is biased into locking positon by spring 41.

The automatic retraction of this locking lever 37 and the feeding movement of the carriage and tray are effected by one or more motors and actuating mechanism carried by a frame 42 which is supported by the casing body. I preferably employ two motors 43 and 43' forward and reverse for actuating the feed of the carriage and the pick-up of the slides although obviously a single reversible motor might be employed.

Motor 43 drives shaft 44 through a gear reduction train 45. Its armature may be adjusted by knob 46.

The step by step feeding movement of the carriage is effected by a rod 47 which is suspended by a link 48 from plate 39. One end 49 of the rod engages in a perforation 31 in the rack 12x of the carriage while the other end 50 is supported by an eccentric cam 51 on the shaft 52. Rotation of shaft 52 therefore serves to provide an oscillating movement of the rod 47 for feeding the carriage forward or backward as the case may be. This shaft 52 also has an eccentric or cam 53 which engages the roller 54 on the end of the locking lever 37 so as to retract the locking prongs from the carriage just before the feeding action of rod 47.

The rotation of shaft 52 is effected from motor driven shaft 44 by a Geneva motion and gear reduction train. Hub 55 on shaft 44 has a projection 56 which coacts with a slotted disc 57 on the shaft of gear 58. This latter gear drives pinion 59 on shaft 52. Disc 57 is yieldingly held in position by a spring-pressed detent 60.

The feed prong 49 of rod 47 engages the carriage 12 only during the feed movement. When it is desired to withdraw the carriage and tray or move them manually, the locking lever 37 and its prongs 40 may be manually retracted by lifting the finger piece 61 which projects outside of the casing.

Slide pick-up mechanism

Between the lamp 4 and the lens 10 is located the guide tube 8 with a pick-up carrier 70 and spring gripping jaws 71 for grasping and picking up the slides and bringing them into alinement with the aperture 8' in the tube 8 into the optical axis of the system. This carrier 70 has rollers 72 which run on flanges 73 at the edges of the guide tube 8. This carrier is raised and lowered by an arm 74 hinged at 75 and connected to the carrier by a link 76 and under tension of spring 77. A pad 78 frictionally engages one side of the tube 8 to hold the carrier against accidental sliding movement.

The movement of the arm 74 is controlled from shaft 44 by means of a cam device and link 80. This link is hinged at 81 to the arm and guided by a washer 82 on shaft 44. The cam device has two plates 83 and 84 which are held together and to the members 82 and 85 by screws or rivets 86. Plate 83 coacts with the roller 87 on the outer face of link 80 and plate 84 coacts with roller 87' on the rear of link 80. The cam device is driven by hub 55 which has a projection 88 that has a limited movement in the slot 89 in member 85. This slot permits a small lost motion between the parts when the action is reversed.

Slide centering mechanism

Figs. 15 to 19a show the means for guiding and centering the slides. The holding members 90 are hinged at 91 to the lugs 92 which project into the guide tube 8. These holding members are hingedly connected together at 93 and biased outwardly by a spring 94. Each member has a centrally grooved jaw 95, which when the holders are pressed toward each other, exactly centers a slide in the center of the focal plane so that no matter what the thickness of the slide it will be accurately centered.

The carrier 70 has a projection 96 which coacts with a roller 97 on one of the holder members as shown in Figs. 19 and 23 to force the holders toward each other when the carrier 70 reaches the proper position.

Slide Release

The guide tube 8 has a slide chute 100 with a flaring mouth 101 for directing the slide S into the chute. At the upper end of the chute, I provide a stop 102 which serves to strip the slide S from the jaws 71 of the pick-up carrier as the carrier moves toward the upper end of its travel and when the holder jaws have grasped it.

On the downward movement of the pick-up, the holder jaws are retracted by spring 94 when the member 96 slides down past roller 97 and automatically release the slide which drops back into the tray.

In case the slide should fail to normally release automatically, I have provided an automatic discharge means including a sub-slide 105 guided with the main carrier 70. The lower end 106 of slide 105 in the position of Fig. 23 extends below the jaws 71 so that as the carrier moves downwardly the end 106 will engage the upper edge of any slide which may have failed to fall automatically from the holder jaws and force it downwardly. Before the pick-up jaws reach the tray, it is obvious that the stop member 106 must be out of the way of the jaws 71. Accordingly spring 107 tends to pull slide 105 upwardly. This is resisted by pawl 108 hinged in the slide 105 which is pressed by a spring 109 so that its tip engages the shoulder 110.

When the carrier 70 and slide 105 move down, the inclined shoulder 111 on pawl 108 engages the fixed projection 112 on plate 39. This forces pawl 108 inwardly and allows spring 107 to retract the slide 105 away from the pick-up jaws so that the jaws can engage a slide S in the tray.

As the pick-up carrier rises the upper end 113 of slide 105 engages the fixed abutment 114 on the upper end of guide tube 8 and forces the slide 105 back to the position of Figs. 22 and 23.

Shutter operation

The shutter mechanism 9 may be of any suitable type arranged to be actuated for time exposure bulb, $1/100$, $1/50$, $1/25$, $1/10$, $1/5$, $1/2$ and 1 second. The shutter may be set from outside the housing (see Fig. 3). To open the shutter, I provide a rotary motor 120 connected by a cord or wire 121 to the usual shutter arm. This shutter motor is controlled by switch 21 previously mentioned.

Focusing

The focusing piece 123 may be removable and adjustable from outside of the housing (see Fig. 1).

Carriage release

A switch 125 actuated by the lifting of the finger piece 61 on locking lever 37 serves to break the control circuit whenever the carriage is released. This releases any slide which may have been left in the holder. When the carriage is released it may be moved manually and removed if desired.

The carriage can be manually indexed and moved so as to allow any desired slide to be shown first.

Inasmuch as the picture film is located in the center of a slide, the centering of a slide in the holding jaws makes it possible to accommodate different types of standard slides which vary from approximately $1/16$ to $1/8$ inch.

Thus once the projector is focused for one type of slide no change of focus is required for another type unless the distance to the screen is changed. In fact, slides of different thickness can be handled in the same carrying tray without re-focusing.

Circuit diagram

The diagram of Fig. 25 illustrates the lamp 4, the instrument circuits with the main supply switch 19, the cover actuated switch 27, the "limit" or cut-off switch 131, the slide release switch 125, the starting relay 132, the interlocking relay 133 and the motors 26, 43, 43' and 120 and the remote control switches 21, 22 and 23.

The "limit" switch 131 is of the snap-over or micro switch of the type which has two positions in one of which it is connected to the relays and to the slide changing switch starting contact and in the other of which it is connected directly to a motor circuit. This switch is actuated in one direction by the slide pick-up arm 74 when it reaches the upper end of its stroke and in the other direction by its usual snap action when released.

The starting relay 132 has two switch members in normally open position.

The interlocking relay 133 has two switch members and is normally energized.

A cycle of movement of the pick-up device starts at the top of the guide tube. When the change slide switch button 22 is depressed the pick-up device descends toward the tray. If a slide is in the holder in the guide tube it is forced to fall into its pocket in the tray. Just before the pick-up jaws reach the tray, the tray is moved forward one step to bring the next slide beneath the jaws. The pick-up jaws then descend, grasp the slide and raise the slide which is then grasped by the holder jaw in the optical axis of the projector. The pick-up device then continues up to the top of the guide tube and stops. The shutter may then be released by pressing switch button 21. The action of the shutter will depend upon how it was previously set.

Operation

To start a slide pick-up cycle, the main power switch is closed. This energizes the interlocking relay and its contacts are closed and current passes through the slide changing switch 22 in its normal position. When this switch is pressed down it closes a circuit through the starting relay 132. This starting relay closes circuits through the motor circuit and the interlocking relay and a cycle of movement starts. As soon as the pick-up arm starts to move downward, the micro limit switch 131 is released and snaps over to open the circuit through both relays. A new circuit, however, has been established through the opposite pole of the micro switch to the motor and the mechanical cycle continues until the micro switch is again actuated by the pick-up arm at the end of the pick-up cycle. At this time the slide changing switch 22 having been released, a circuit is again established through the interlocking relay.

In case the slide changing switch 22 is held depressed, the cycle will be completed but will not be re-established because the circuit through the interlocking relay remains open as long as the slide changing switch is depressed.

In case it is desired to release a slide which is in the projecting position and the pick-up is in its raised position, the motor circuit may be opened by a release switch 125 actuated by lifting the locking lever 37.

By simultaneously pressing and holding down the slide release switch and the carriage release lever, the slide tray may be withdrawn at any point in the showing sequence. When the release switch and lever are released, the slide changing mechanism returns itself to normal operating position.

It is possible to pass from slide to slide without exposure by simply omitting operation of shutter switch 21.

I claim:

1. In a slide projector, a horizontally movable carriage, a slide holding tray supported by said carriage, a vertical slide guide tube, a pair of slide holding and centering jaws carried by said tube, a vertically movable pick-up member in said tube having means for actuating said slide holding jaws, a slide releasing device carried by said pick-up member and movable with respect thereto, latching means carried by said releasing device, and an abutment for engaging said releasing device and releasing said latching means, and a spring for raising said device when unlatched.

2. In a projecting machine, the combination of, projecting means, a tray for a plurality of slides to be projected, a reciprocating lever, actuating means for operating said lever, a pick-up device carried by said lever and arranged to engage and lift a slide from said tray into registry with said projecting means, stripping means for detaching a slide from the pick-up device to permit it to fall by gravity to position in the tray, guiding means cooperating with said pick-up device to guide said slides in their intended paths during manipulation of the slides, reciprocating means for advancing the tray and slides in predetermined steps, and mechanism connected with said actuating means for operating said reciprocating means and reversible electromotive driving means for said mechanism whereby said tray may be moved forwardly or backwardly.

3. In a projecting machine, the combination of, projecting means, a tray for a plurality of slides to be projected, a swinging lever, actuating means for operating said lever, a pick-up device moved by said lever and arranged to engage and lift a slide from said tray into registry with said projecting means, stripping means for detaching a slide from the pick-up device and returning it to position in the tray, guiding means cooperating with said pick-up device to guide said slides in their intended paths during manipulation of the slides, electrically actuated reciprocating means for advancing the tray and slides, and electromotive mechanism connected with said actuating means for operating said reciprocating means, and remote control means for reversing the direction of movement of said mechanism.

4. A projector comprising a housing, a slide-holding carriage movable longitudinally in said housing, a projecting system located above said carriage including a source of light and a lens, electrically actuated mechanism for picking up successive slides from said carriage and placing them successively between said source of light and said lens, said mechanism including electromotive means for feeding said carriage step by step in said housing, a locking device for holding said carriage against longitudinal movement within said housing, and a switch for controlling said feeding electromotive means, said locking device including manually operative means for the release of the locking action, and means for mechanically interconnecting said switch and said manually operative means whereby release of the locking action simultaneously terminates feeding of said carriage.

5. In a projecting machine, the combination according to claim 3 in which the remote control means are electrical and include a source of electrical energy, electro-mechanical means including a duplex group of motors capable of motion in alternative directions and connected to said tray advancing means, a control switch for selectively determining the direction of motion of said duplex motor group means, and a limit switch actuated by the tray advancing means at the respective limits of motion thereof and connected in circuit with said duplex motor group means so as to shift determination of the actual operation thereof to said actuating means for said electromotive mechanism, at one position of said limit switch.

6. In a projector of the type described having a shutter, a movable tray carrying a plurality of slides, electro-mechanical mechanism including a duplex group of motors for advancing said tray and mechanism for selectively changing slides from said tray, an electrical remote control device including a source of electric power, means for determining the direction of movement of said tray advancing mechanism, a slide change switch having two positions, an interlock relay normally excited when said switch is in inoperative position, a starting relay excited upon operation of said switch so as to initiate operation of said duplex motor group mechanism, and a limit switch mechanically operative by actual advance of said tray so as to connect said duplex motor group mechanism to said power source and to remove control of operation of said duplex motor group mechanism from both said relays.

7. A remote control device according to claim 6 including a single motor for controlling shutter operation of the projector, a shutter switch normally connecting said motor to one side of said power source, and means connecting said single motor to the other side of said source via said interlock relay, whereby operation of said shutter switch after said limit switch has operated is rendered ineffective to cause actuation of said single shutter motor.

8. In a projector, a horizontally slidable carriage for holding successively positioned slides, a perforated rack member mounted along one edge of said carriage, a reciprocating feeding pawl member coacting with said rack member to move said carriage forward and backward step by step, a locking pawl spring-pressed into engagement with said rack member for locking said carriage against movement, electromotive means for retracting said locking pawl and actuating said feeding pawl member in a forward step by step feeding direction, a second electromotive means for retracting said locking pawl and actuating said feeding pawl member in a backward step by step feeding direction, means driven alternatively by each of said electromotive means for raising slides successively from said carriage and returning said slides to the carriage and a reversing switch for selectively coupling either of said electromotive means in a power circuit.

JAMES ALLEN TUCK.

REFERENCES CITED

The following references are of record in the file of this patent:

UNITED STATES PATENTS

| Number | Name | Date |
|---|---|---|
| 300,558 | Barstow | June 17, 1884 |
| 594,819 | Allen | Nov. 30, 1897 |
| 773,786 | Colardean et al. | Nov. 1, 1904 |
| 1,402,791 | Petherick | Jan. 10, 1922 |
| 1,921,214 | Carpenter | Aug. 8, 1933 |
| 1,925,149 | McCandless | Sept. 5, 1933 |
| 1,966,531 | Tint | July 17, 1934 |
| 1,978,500 | Meyer | Oct. 30, 1934 |
| 2,208,944 | Krupnik | July 23, 1940 |
| 2,260,673 | Kende | Oct. 28, 1941 |
| 2,298,413 | Reid | Oct. 13, 1942 |
| 2,375,706 | Stechbart et al. | May 8, 1945 |
| 2,401,506 | Pechkranz | June 4, 1946 |
| 2,427,164 | Stechbart | Sept. 9, 1947 |
| 2,460,359 | Page | Feb. 1, 1947 |
| 2,468,566 | Marcus et al. | Apr. 26, 1949 |
| 2,487,476 | Pratt et al. | Nov. 8, 1949 |

FOREIGN PATENTS

| Number | Country | Date |
|---|---|---|
| 19,082 | Switzerland | Apr. 12, 1899 |
| 249,787 | Great Britain | Apr. 1, 1926 |
| 215,992 | Switzerland | July 31, 1941 |